Patented Mar. 9, 1943

2,313,420

UNITED STATES PATENT OFFICE 2,313,420

FERROUS ALLOY

Arthur T. Cape, Santa Cruz, Calif., assignor to Coast Metals, Inc., Canton, Ohio, a corporation of Ohio No Drawing. Application July 16, 1942, Serial No. 451,203

6 Claims. (Cl. 75—128)

This invention relates generally to ferrous alloys, but has reference more particularly to an alloy which is particularly adapted for use in the form of weld rods for hard facing purposes.

A primary object of the invention is to provide a weld rod for this purpose which may be used for hard facing various articles which have been subjected to wear and abrasion, but which is especially adapted for hard facing hot shears, hot working dies, soaking pit tongs, and devices for carrying or transporting hot ingots, and the like.

The weld rod derives its usefulness from the fact that it is formed of a ferrous alloy which not only has high resistance to wear and abrasion, but has high resistance, as well, to heavy and repeated impacts, that is to say, it possesses high mechanical strength. It is also resistant to chemical corrosion and to oxidation at high temperatures, retains its strength at high temperatures, has the quality of being capable of forming a sound bond with the base metal, has a high viscosity, in the molten condition, such as to permit exceedingly easy application thereof to the base metal, and is further characterized by the fact that it is hard and tough, its hardness being relatively low from the point of view of indentation hardness, except in the upper portion of its carbon range, where its hardness may be 60+ Rockwell C. The wear resistance is high at all hardnesses, which range from 40 to 60+ Rockwell C.

The weld rod is preferably made from a ferrous alloy containing from about 2 to about 4.25% carbon, chromium in amount of from about 6% to about 28%, nickel in amounts of from about 3% to about 10%, molybdenum in amounts of from about 5% to about 10%, and cobalt in amounts of from about 10% to about 30%, the balance of the alloy being substantially all iron. An alloy within this range which has been found particularly useful contains about 2.75% carbon, about 16% chromium, about 6% nickel, about 8% molybdenum, and about 20% cobalt.

As previously stated, the alloy is especially characterized by the fact that it is hard and tough and has excellent high temperature properties, rendering it especially useful for facing hot shears and dies, soaking pit tongs, and devices for carrying hot ingots. The cobalt is of particular importance in controlling the coefficient of expansion of the alloy, and for aiding in the welding of the alloy to ferritic steels, and for contributing markedly to the welding characteristics of the alloy. The best results, in general, are obtained with cobalt in amounts of from about 20% to about 25%.

I claim:

1. A ferrous alloy particularly adapted for hard facing purposes, said alloy containing carbon in amounts of from about 2% to about 4.25%, about 6% to about 28% chromium, about 3% to about 10% nickel, about 5% to about 10% molybdenum, and about 10% to about 30% cobalt, the remainder of said alloy being substantially all iron.

2. A ferrous alloy particularly adapted for hard facing purposes, said alloy containing about 2.75% carbon, about 16% chromium, about 6% nickel, about 8% molybdenum and about 20% cobalt, the remainder of said alloy being substantially all iron.

3. A weld rod for hard facing purposes, said rod comprising a ferrous alloy containing carbon in amounts of from about 2% to about 4.25%, about 6% to about 28% chromium, about 3% to about 10% nickel, about 5% to about 10% molybdenum, and about 10% to about 30% cobalt, the remainder of said alloy being substantially all iron.

4. A weld rod for hard facing purposes, said rod comprising a ferrous alloy containing about 2.75% carbon, about 16% chromium, about 6% nickel, about 8% molybdenum and about 20% cobalt, the remainder of said alloy being substantially all iron.

5. A heat and abrasion resistant facing comprising a ferrous alloy containing carbon in amounts of from about 2% to about 4.25%, about 6% to about 28% chromium, about 3% to about 10% nickel, about 5% to about 10% molybdenum, and about 10% to about 30% cobalt, the remainder of said alloy being substantially all iron.

6. A heat and abrasion resistant facing comprising a ferrous alloy containing about 2.75% carbon, about 16% chromium, about 6% nickel, about 8% molybdenum and about 20% cobalt, the remainder of said alloy being substantially all iron.

ARTHUR T. CAPE.